(12) United States Patent
Goto et al.

(10) Patent No.: US 7,746,313 B2
(45) Date of Patent: Jun. 29, 2010

(54) DISPLAY DEVICE EMPLOYING A TIME-DIVISION-MULTIPLEXED DRIVER

(75) Inventors: Kazutaka Goto, Mobara (JP); Hiroaki Asuma, Mobara (JP); Atsushi Hasegawa, Togane (JP)

(73) Assignee: Hitachi Displays, Ltd., Chiba (JP)

( * ) Notice: Subject to any disclaimer, the term of this patent is extended or adjusted under 35 U.S.C. 154(b) by 1497 days.

(21) Appl. No.: 11/062,804

(22) Filed: Feb. 23, 2005

(65) Prior Publication Data

US 2005/0200582 A1    Sep. 15, 2005

(30) Foreign Application Priority Data

Mar. 9, 2004    (JP)    ............... 2004-065054

(51) Int. Cl.
G09G 3/36    (2006.01)
(52) U.S. Cl. ........................................ 345/100; 345/89
(58) Field of Classification Search ................ 345/87, 345/96, 98, 100, 205, 89, 690
See application file for complete search history.

(56) References Cited

U.S. PATENT DOCUMENTS

| 6,424,328 | B1 * | 7/2002 | Ino et al. ................ 345/87 |
| 6,774,574 | B1 | 8/2004 | Koyama et al. |
| 7,102,606 | B2 * | 9/2006 | Miyajima et al. ............ 345/92 |
| 7,511,691 | B2 | 3/2009 | Hirayama et al. |
| 2003/0085885 | A1 * | 5/2003 | Nakayoshi et al. .......... 345/205 |

FOREIGN PATENT DOCUMENTS

| CN | 1279519 | 1/2001 |
| JP | 7-143285 | 6/1995 |
| JP | 11-327518 | 11/1999 |
| JP | 2003-122313 | 4/2003 |
| JP | 2005-195703 | 7/2005 |

* cited by examiner

*Primary Examiner*—Chanh Nguyen
*Assistant Examiner*—Pegeman Karimi
(74) *Attorney, Agent, or Firm*—Antonelli, Terry, Stout & Kraus, LLP.

(57) ABSTRACT

A display device includes sub-pixels, video lines, a drive circuit and switch groups. The video lines are divided into plural blocks each composed of m video lines, m being an integer of 2 or more. The drive circuit outputs m gray scale voltages time-sequentially. Each of the switch groups corresponding to one of the blocks is composed of first to mth switches, receives the m gray scale voltages from the drive circuit, and then supplies them to the m video lines in a time-division multiplexed fashion. The mth switch is turned on last during a writing time for writing the m gray scale voltages into the sub-pixels, and $Tq<Tm$, where $Tm$ and $Tq$ are times during which the mth switch and a qth switch of the first to $(m-1)$th switches are turned on, respectively, and q is an integer of from 1 to $(m-1)$.

3 Claims, 8 Drawing Sheets

DISPLAY DEVICE EMPLOYING A TIME-DIVISION-MULTIPLEXED DRIVER

CLAIM OF PRIORITY

The present application claims priority from Japanese application serial no. 2004-065054, filed on Mar. 9, 2004, the content of which is hereby incorporated by reference into this application.

BACKGROUND OF THE INVENTION

The present invention relates to a display device, and in particular to a technique useful for application to a display device employing a time-division-multiplexed driving. TFT (Thin Film Transistor) type liquid crystal modules are widely used as displays for portable equipment such as notebook personal computers or the like. Especially, liquid crystal display modules provided with a small-sized liquid crystal display panel are used as displays for portable equipment always carried such as mobile phones, for example.

Usually there are as many outputs of a drain driver (also called a video line drive circuit) for driving a liquid crystal display panel as there are video lines (also called drain lines) of the liquid crystal display panel, and each of the outputs of the drain driver is coupled to a corresponding one of the video lines.

On the other hand, for the purpose of miniaturizing a drain driver, Japanese Patent Application Laid-Open No. Hei 11-327518 Publication (which corresponds to U.S. Pat. No. 6,424,328 B1) discloses a so-called time-division-multiplexed driving method as a driving method of a liquid crystal display panel which is capable of reducing the number of output pins (output terminals) of a drain driver. In this time-division-multiplexed driving method, video lines are divided into plural units (blocks) each composed of plural video lines. Signals to be supplied to plural video lines of each of the blocks are output from the drain driver in a time-sequential fashion. The liquid crystal display panel is provided with plural time-division switches each corresponding to one of the blocks of the plural video lines, and each of the time-division switches receives the time-sequential signals outputted from the drain driver and supplies the time-sequential signals to the plural video lines of a corresponding one of the blocks in a time-sequential fashion.

SUMMARY OF THE INVENTION

Known among the liquid crystal display modules is a liquid crystal display module (hereinafter called the polysilicon type liquid crystal display module) which uses polysilicon as semiconductor layers of thin film transistors (TFTs). The polysilicon type liquid crystal display module has a feature that its liquid crystal display panel is capable of being configured so as to provide a higher definition than a liquid crystal display module which uses amorphous silicon as semiconductor layers of thin film transistors (TFTs). In the case of this higher-definition display panel, the sub-pixel pitch is naturally reduced, the number of video lines for supplying gray scale voltages to respective sub-pixels is increased, and consequently, the routing of interconnection wiring becomes difficult. Here a sub-pixel is defined as the smallest unit which can be manipulated within a display image.

To solve this problem, in the display device shown in FIG. 7, switching elements SW1, SW2, SW3 provided within the liquid crystal display panel drive the liquid crystal display panel in a time-division multiplexed fashion by distributing gray scale voltages outputted from a drain driver (not shown) to three video lines for R, G and B, respectively, within the liquid crystal display panel. Here, in FIG. 7, reference numeral 20 denotes a signal line supplied with a video-line selection pulse φR, reference numeral 21 denotes a signal line supplied with a video-line selection pulse φG, reference numeral 22 denotes a signal line supplied with a video-line selection pulse φB, reference numeral 30 denotes a signal line supplied with gray scale voltages from a drain driver 100 (not shown), and reference numerals 31R, 31G, 31B denote video lines for red (R), green (G), blue (B), respectively. The switching elements SW1, SW2, SW3 are comprised of thin film transistors which use polysilicon as their semiconductor layers.

However, the present inventors have found out that there is a problem in that time for writing gray scale voltages from video lines into sub-pixels becomes insufficient in this time-division multiplexed driving method when the liquid crystal display panel is configured so as to provide a higher definition, since writing time T available for writing gray scale voltages into three sub-pixels in a time-division multiplexed fashion is usually divided into three equal intervals for three sub-pixels, respectively.

In this time-division multiplexed driving method, timings for writing of gray scale voltages into three respective video lines 31R, 31G, 31B to be started from the start of the above-mentioned writing time T. Therefore, by way of example, consider a case where gray scale voltages are supplied in the order of red (R), green (G) and blue (B) in a time-division multiplexed fashion to the video lines 31R, 31G and 31B. In this case, a sub-pixel coupled to the video line 31B has a gray scale voltage written thereinto last, and the time used for writing the gray scale voltage from the video line 31B into this sub-pixel is shorter than the used for writing gray scale voltages into sub-pixels coupled to the video lines 31R and 31G.

In the case of the usual time-division multiplexed driving method, since the writing time T available for writing gray scale voltages into three sub-pixels in a time-division multiplexed fashion is usually divided into three equal intervals for three sub-pixels, respectively, and therefore, while red (R) and green (G) gray scale voltages are provided with the times T and 2T/3, respectively, for writing the gray scale voltages into sub-pixels, blue (B) gray scale voltages are provided only with the time T/3 for writing the gray scale voltages into sub-pixels.

Further, when the pixel size is made finer and the number of lines to be displayed during one frame period is increased, the horizontal scanning period is made shorter in inverse proportion to the number of lines, and therefore the above-explained writing time T is made shorter. Consequently, the time available for writing gray scale voltages sometimes becomes insufficient in sub-pixels coupled to video lines into which the gray scale voltages are written last during the writing time T available for writing gray scale voltages into three sub-pixels in a time-division multiplexed fashion.

The present invention has been made to solve the problem with the above conventional technique, and it is an object of the present invention to provide a technique capable of securing sufficient time for writing gray scale voltages into each of the sub-pixels in a display device employing a time-division multiplexed driving even when the display area is configured so as to provide a higher definition.

The above and other objects and novel features of the present invention will become more apparent upon reference to the following description of the specification and the accompanying drawings.

The following will explain briefly the summary of the representative ones of the inventions disclosed in this specification.

To accomplish the above-described objects, in accordance with an embodiment of the present invention, there is provided a display device comprising: a display section including a plurality of sub-pixels and a plurality of video lines which supply gray scale voltages to said plurality of sub-pixels, said plurality of video lines being divided into a plurality of blocks each comprised of m video lines of said plurality of video lines, m being an integer equal to or greater than 2; a video line drive circuit which outputs m gray scale voltages corresponding to m video lines of each of said plurality of blocks time-sequentially; and a plurality of switch groups each comprised of first to mth switches, each of said plurality of switch groups corresponding to one of said plurality of blocks of video lines, receiving said m gray scale voltages from said video line drive circuit, and then supplying said m gray scale voltages to said m video lines of said one of said plurality of blocks in a time-division multiplexed fashion, wherein said mth switch is turned on last during a writing time T during which said m gray scale voltages are written into corresponding ones of said plurality of sub-pixels, and the following inequality is satisfied: Tq<Tm, where Tm is a time during which said mth switch is turned on, Tq is a time during which a qth switch of said first to (m−1)th switches is turned on, and q is an integer of from 1 to (m−1).

To accomplish the above-described objects, in accordance with another embodiment of the present invention, there is provided a display device comprising: a display section including a plurality of sub-pixels and a plurality of video lines which supply gray scale voltages to said plurality of sub-pixels, said plurality of video lines being divided into a plurality of blocks each comprised of m video lines of said plurality of video lines, m being an integer equal to or greater than 2; a video line drive circuit which outputs m gray scale voltages corresponding to m video lines of each of said plurality of blocks time-sequentially; and a plurality of switch groups each comprised of first to mth switches, each of said plurality of switch groups corresponding to one of said plurality of blocks of video lines, receiving said m gray scale voltages from said video line drive circuit, and then supplying said m gray scale voltages to said m video lines of said one of said plurality of blocks in a time-division multiplexed fashion, wherein said mth switch is turned on last during a writing time T during which said m gray scale voltages are written into corresponding ones of said plurality of sub-pixels, and the following inequality is satisfied: T−Tsm>T/m, where Tsq is a time from a beginning of said writing time T until a qth switch of said first to mth switches is turned on, and q is an integer of from 1 to m.

To accomplish the above-described objects, in accordance with an embodiment of the present invention, there is provided a display device comprising: a display section including a plurality of sub-pixels and a plurality of video lines which supply gray scale voltages to said plurality of sub-pixels, said plurality of video lines being divided into a plurality of blocks each comprised of m video lines of said plurality of video lines, m being an integer equal to or greater than 2; a video line drive circuit which outputs m gray scale voltages corresponding to m video lines of each of said plurality of blocks time-sequentially; and a plurality of switch groups each comprised of first to mth switches, each of said plurality of switch groups corresponding to one of said plurality of blocks of video lines, receiving said m gray scale voltages from said video line drive circuit, and then supplying said m gray scale voltages to said m video lines of said one of said plurality of blocks in a time-division multiplexed fashion, wherein said mth switch is turned on last during a writing time T during which said m gray scale voltages are written into corresponding ones of said plurality of sub-pixels, and there is a qth switch among said first to (m−1)th switches, said qth switch satisfying the following inequality: Tq<Tm, where Tm is a time during which said mth switch is turned on, and Tq is a time during which said qth switch is turned on.

The following will explain the advantages obtained by the representative ones of the inventions disclosed in this specification.

The present invention is capable of securing sufficient time for writing gray scale voltages into each of the sub-pixels in a display device employing a time-division multiplexed driving even when the display area is configured so as to provide a higher definition.

BRIEF DESCRIPTION OF THE DRAWINGS

In the accompanying drawings, in which like reference numerals designate similar components throughout the figures, and in which.

DETAILED DESCRIPTION OF THE PREFERRED EMBODIMENTS

Since the liquid crystal display device can be thought to be most generally used among various kinds of display devices now, the following explanation is given using the liquid crystal display device as a representative example of display devices. Therefore the present invention is also applicable to display devices other than liquid crystal display devices, such as organic EL (Electroluminescent) display devices, display devices employing light emitting diodes.

In the following, an embodiment in which the present invention is applied to a liquid crystal display module will be explained in detail with reference to the drawings. The same

Example 1

Figure 1:
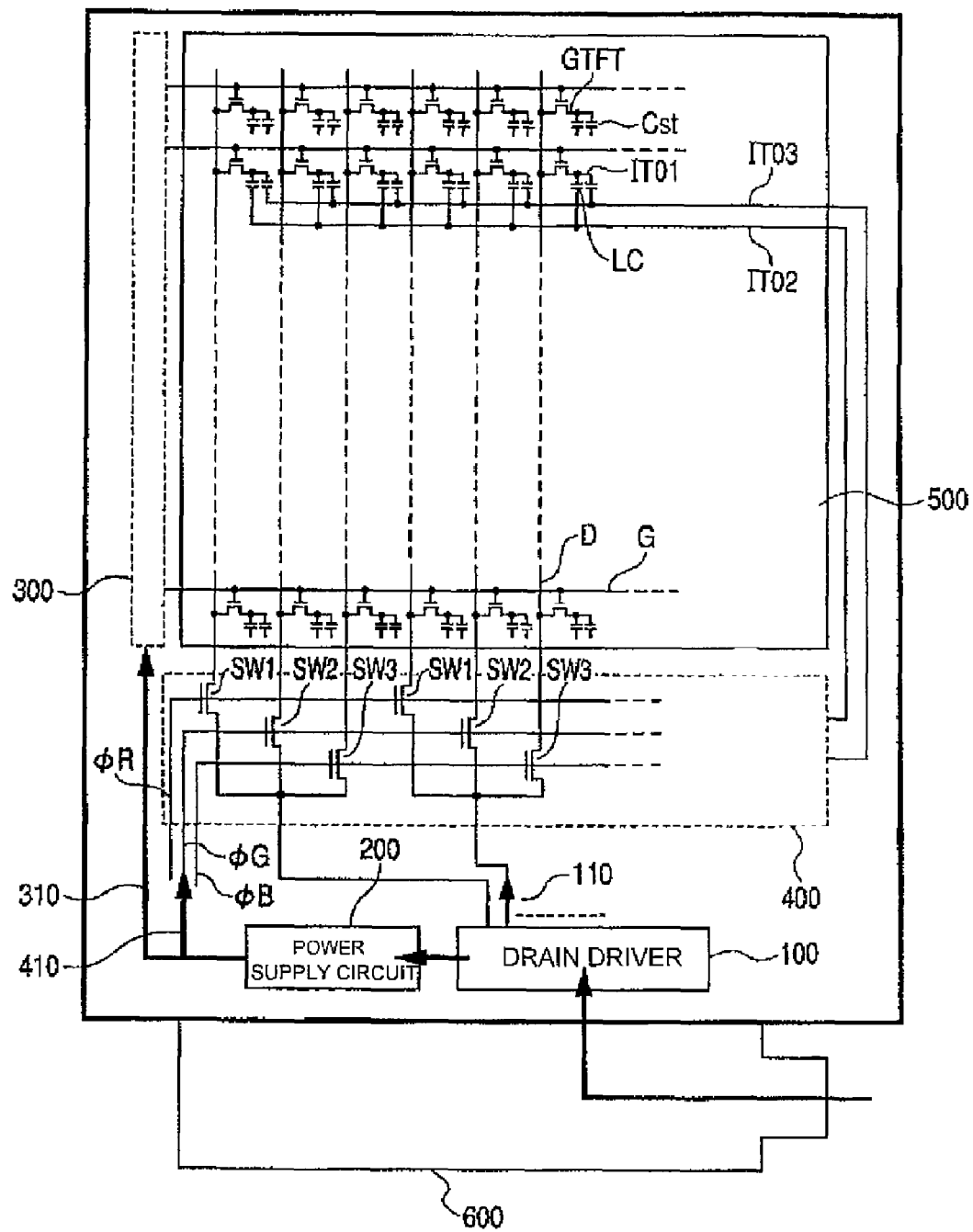
FIG. 1 is a block diagram illustrating a rough configuration of a liquid crystal display module in accordance with Example 1 of the present invention.

FIG. 1 is a block diagram illustrating a rough configuration of a liquid crystal display module in accordance with Example 1 of the present invention. The liquid crystal display module of Example us a polysilicon type liquid crystal display module which uses polysilicon as semiconductor layers of thin film transistors (GTFTs).

The liquid crystal display module of Example 1 comprises a drain driver (a video line drive circuit) 100, a power supply circuit 200, a gate scanning circuit 300, a drain line selection switching circuit 400, and a display section 500. The drain line selection switching circuit 400 comprises a plurality of the circuits shown in FIG. 7. The display section 500 includes a plurality (for example, 240×320×x3) of sub-pixels arranged in a matrix fashion, a plurality of video lines D (also called drain lines) for supplying video signal voltages to respective sub-pixels, and a plurality of scanning lines G (also called gate lines) for supplying scanning signal voltages to respective sub-pixels.

Each of the sub-pixels is provided with a pixel transistor G composed of a thin film transistor, the pixel transistor GTF is coupled between one of the video lines and a pixel electrode ITO1, and a gate of the pixel transistor GTFT is coupled to one of the gate lines.

Figure 7:
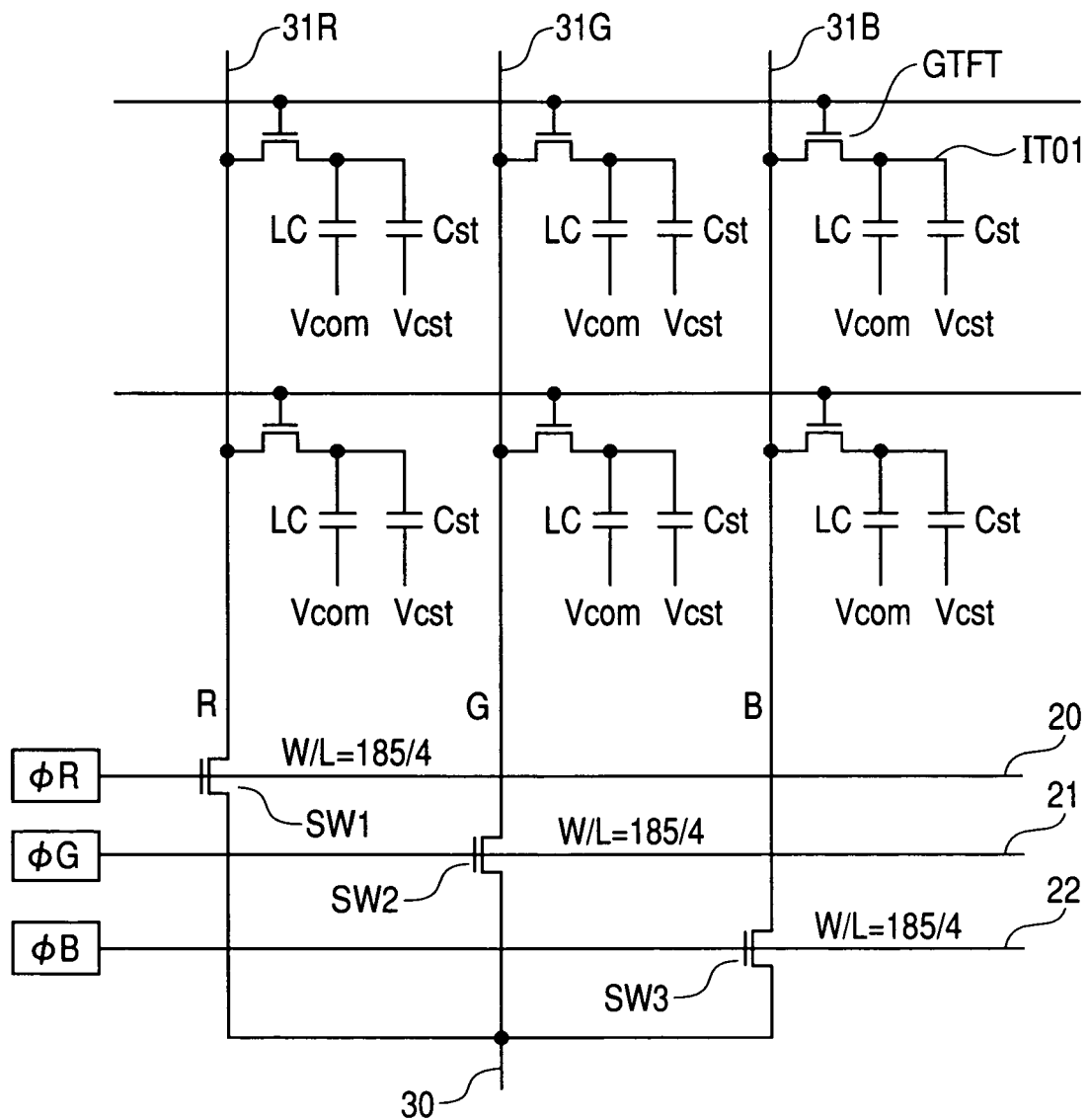
FIG. 7 is a circuit diagram for carrying out a time-division multiplexed driving method.

Since a liquid crystal material is filled between the pixel electrode ITO1 and a common electrode ITO2, a pixel capacitance LC equivalent to the liquid crystal layer is considered as coupled between the pixel electrode ITO1 and the common electrode ITO2. Further, a storage capacitance Cst is also coupled between the pixel electrode ITO1 and a storage electrode ITO3. As shown in FIG. 7, the common electrode ITO2 is supplied with a common-electrode voltage Vcom, and the storage electrode ITO3 is supplied with a voltage Vcst.

In FIG. 1, reference numeral 600 denotes a flexible wiring board for coupling the liquid crystal display module to a wiring board of a main body including a CPU (Central Processing Unit), a display controller and others. The drain driver 100 and the power supply circuit 200 are comprised of semiconductor chips, respectively. These semiconductor chips are mounted on an insulating substrate SUB on which the display section 500 is formed, using COG (Chip On Glass) technology, for example. However, this Example 1 is not limited to this configuration, at least one of the two semiconductor chips may be mounted on the flexible wiring board 600. Further, the drain driver 100 and the power supply circuit 200 may be integrated into a single semiconductor chip.

The gate scanning circuit 300 and the drain line selection switching circuit 400 are comprised of thin film transistors which use polysilicon as semiconductor layers, and are fabricated on the same substrate with the pixel transistors GTF of the sub-pixels, as a unitary structure.

In this Example 1, the drain driver 100 is externally supplied with display data, display control signals and others, and the drain driver 100 generates gray scale voltages 110 and timing pulses for driving the liquid crystal display module.

A gate drive pulse 310 and drain line selection pulses 410 among the timing pulses are converted in terms of voltages by the power supply circuit 200, and then are supplied to the gate scanning circuit 300 and the drain line selection switching circuit 400, respectively. The gate scanning circuit 300 outputs a gate selection signal to the scanning lines G successively based upon the gate drive pulses 310. The drain line selection switching circuit 400 distributes gray scale voltages supplied from the drain driver 100 to video lines D for red (FR), green (G) and blue (B), respectively, based upon the drain line selection pulses 410 in a time-division multiplexed fashion, during a time when the gate selection signal is applied on a corresponding one of the scanning lines G. Reference symbols $\phi_R$, $\phi_G$, and $\phi_B$ denote video time selection pulses applied to gate electrodes of the switching elements SW1, SW2, and SW3, respectively, shown in FIG. 7.

The following will explain a method of driving the liquid crystal display module of this Example 1. Gate selection signals are supplied to the scanning lines G successively from the gate scanning circuit 300, and are applied to the gates of the pixel transistors GTFT, and rows of the pixel transistors GTF corresponding to one display line are turned ON successively.

When gray scale voltages are applied to the video lines D via the drain line selection switching circuit 400 from the drain driver 100 in a state where the pixel transistors GTFT are ON, the gray scale voltages are applied to the pixel electrodes ITO1 through the pixel transistors GTFT, and thereby the gray scale voltages are written into the pixel capacitances LC and the storage capacitances Cst. In this way, a display is produced in accordance with the gray scale voltages written into the pixel capacitances LC and the storage capacitances Cst.

In this Example 1, a so-called common-electrode-voltage inversion method is employed as a driving method of applying ac voltages across the liquid crystal layer. The common-electrode-voltage inversion method is carried out as follows. A common-electrode voltage Vcom applied to the common electrode ITO2 is switched between a high-voltage common-electrode voltage VcomH and a low-voltage common-electrode voltage VcomL at specified time intervals. When the common electrode ITO2 is supplied with the low-voltage common-electrode voltage VcomL, the pixel electrode ITO1 is supplied with a gray scale voltage higher than the low-voltage common-electrode voltage VcomL, and when the common electrode ITO2 is supplied with the high-voltage common-electrode voltage VcomH, the pixel electrode ITO1 is supplied with a gray scale voltage lower than the high-voltage common-electrode voltage VcomH. However, the present invention is not limited to a driving by the common-electrode-voltage inversion method, but may be applied to other driving methods such as a line-inversion driving method, a column-inversion driving method, and a dot-inversion driving method.

Figure 8:
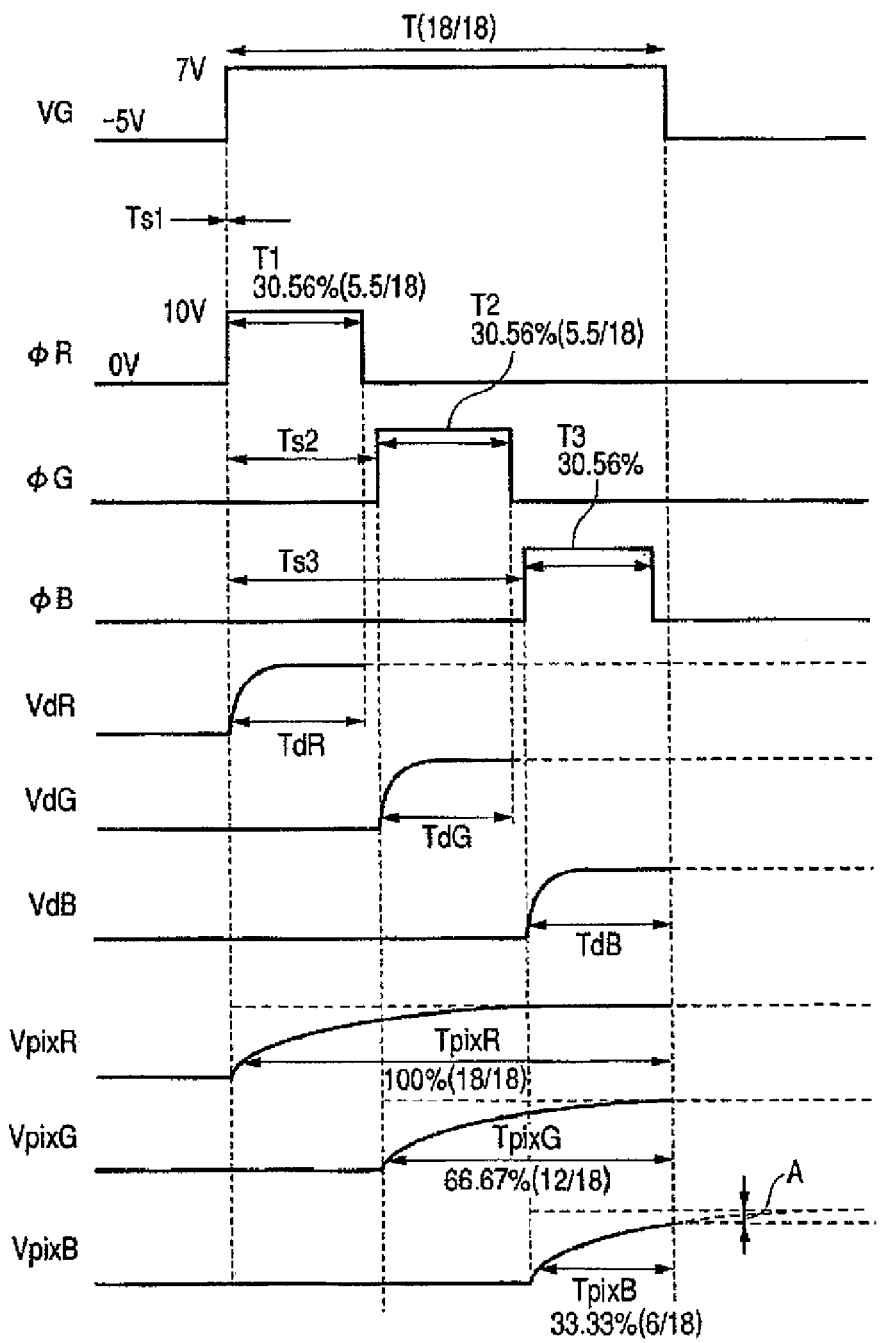
FIG. 8 is an illustration for explaining a conventional time-division multiplexed driving method.

FIG. 8 is an illustration for explaining the conventional time-division multiplexed driving method. In FIG. 8 and subsequent FIGS. 2 and 3, reference symbol VG denotes voltages successively output to the scanning lines G from the gate scanning circuit 300. In FIG. 8, a gate selection signal is depicted by a time T during which the voltage VG is at a high level (hereinafter called simply the H level), and denotes a writing time (hereinafter called a gate selection time) for writing a gray scale voltage into a sub-pixel. Reference symbols φR, φG and φB denote video line selection pulses applied to gate electrodes of the switching elements SW1, SW2 and SW3, respectively, shown in FIG. 7, and reference symbols T1, T2 and T3 denotes times during which the video line selection pulses φR, φG and φB are at the H level.

Hereinafter, the duration of each of the times T1, T2, T3 is sometimes expressed in a value relative to or as a percentage of the duration of the gate selection time T. In the accompanying drawings, the duration of the gate selection time T is indicated as being equal to the duration of 18 clock pulses simply for convenience.

Further, reference symbols VdR, VdG and VdB denote voltage changes on respective video lines D when the switching elements SW1, SW2 and SW3 shown in FIG. 7 are turned on. Reference symbols TdR, TdG and TdB denote video-line writing times during which gray scale voltages are written into corresponding ones of the video lines D. In FIG. 8, reference symbols VdR, VdG and VdB denote voltage changes in a case where the gray scale voltages swing toward higher voltages. Reference symbols VpixR, VpixG and VpixB denote voltage changes at corresponding sub-pixels when the switching elements SW1, SW2 and SW3 shown in FIG. 7 are turned on. Reference symbols TpixR, TpixG and TpixB denote sub-pixel writing times during which the gray scale voltages are written into the corresponding sub-pixels.

As shown in FIG. 8, in the conventional time-division multiplexed driving method, each of the times T1, T2 and T3 is one of the three approximately equal intervals into which the gate selection time T is divided, that is, T1=T2=T3≈T/3. When the video line selection pulses φR, φG and φB change to the H level, the voltages VdR, VdG and VdB rise with the same speed as shown in FIG. 8, and the voltages VdR, VdG and VdB are written into the pixel capacitances LC and the storage capacitances Cst of the sub-pixels via ON-resistances of the pixel transistors GTFT. In this case, if the ON-resistances of the pixel transistors GTFT are large, a long time is required for writing the voltages VdR, VdG and VdB into the pixel capacitances LC and the storage capacitances Cst of the sub-pixels.

However, as shown in FIG. 8, the sub-pixel writing time TpixB for the gray scale voltage to be written into the blue (B) sub-pixel is shorter than the sub-pixel writing times TpixR and TpixG for the gray scale voltages to be written into the red (R) and green (G) sub-pixels, respectively. Consequently, in some case, the writing time for writing the voltage VdB into the sub-pixels as gray scale voltages is insufficient, and therefore insufficiency of writing of a gray scale voltage occurs as shown in a portion designated A in FIG. 8, for example, and this degrades the display quality of images displayed on the liquid crystal display panel. This phenomenon becomes pronounced when the liquid crystal display panel is configured so as to provide a higher definition.

Figure 2:
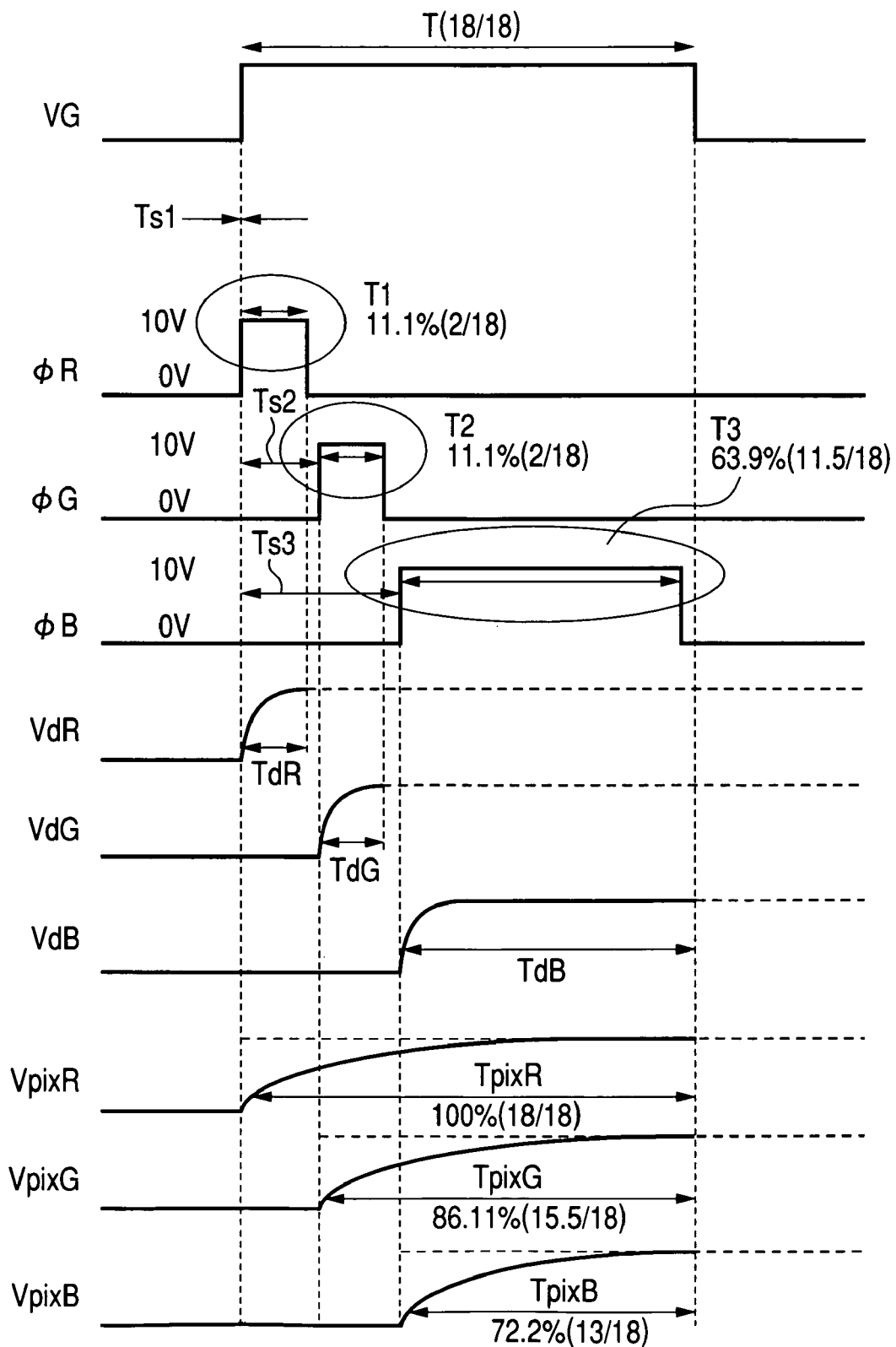
FIG. 2 is an illustration for explaining a time-division multiplexed driving method of Example 1 in accordance with the present invention.

FIG. 2 is an illustration for explaining a time-division multiplexed driving method of this Example 1 in accordance with the present invention.

As shown in FIG. 2, in this Example 1, times during which the video line selection pulses φR, φG and φB stay at the H level are not equal to each other in duration, but are made unequal to each other. To put it another way, the timings of start of time-division multiplexed signals are not equally spaced, but are unequally spaced.

In FIG. 2, T1=T2<T3, and the relationship between the times T1, T2, T3 and T is such that T1=T2=0.111×T and T3=0.639×T. That is to say, in the switching element SW3 which is switched on last, the time T3 is made longer than T/3. It is preferable that the time T3 is selected to be equal to or longer than T/2.

When the video line selection pulses φR, φG and φB change to the H level, the voltages VdR, VdG and VdB rise with the same speed as shown in FIG. 2, and the voltages VdR, VdG and VdB are written into the pixel capacitances LC and the storage capacitances Cst of the sub-pixels via ON-resistances of the pixel transistors GTFT.

In this case, let Ts1, Ts2 and Ts3 be times until the switching elements SW1, SW2 and SW3 are turned on from the beginning of the writing time T available for writing gray scale voltages into three sub-pixels in a time-division multiplexed fashion (the gate selection time T). In the switching element SW3 which is switched on last, the time Ts3 in the case of FIG. 2 is shorter than that in the case of FIG. 8. That is to say, the switching element SW3 in this Example 1 is switched on earlier than the switching element SW3 in the conventional time-division multiplexed driving method. As a result, the sub-pixel writing time TpixB for writing the voltage VdB into the blue (B) sub-pixel is lengthened compared with that in the case of FIG. 8, and therefore sufficient times are ensured for writing gray scale voltages into the sub-pixels. Consequently, even when the liquid crystal display panel is configured so as to provide a higher definition, this Example 1 is capable of retaining the display quality of images displayed on the liquid crystal display panel.

Here, the writing time TpixB can be selected to satisfy the relationship: TpixB=T−Ts3>T/3. It is preferable to select the writing time TpixB can be selected to satisfy the relationship: TpixB=T−Ts3>T/2, as shown in FIG. 2.

In the following, the gist of this Example 1 will be described. In a case where gray scale voltages are supplied to respective ones of plural video lines via ON/OFF-controllable switching elements during one gate selection time T in a time-division multiplexed fashion, the ON-time of a given switching element which supplies a gray scale voltage to a video line last during one gate selection time T is selected to be longer than the ON-time of at least one of switching elements which supply gray scale voltages to video lines before the given switching element during the one gate selection time T. Therefore, although the above explanation has been given to the case where T1=T2<T3, as for the relationship among T1, T2 and T3, it is only necessary that at least one of the inequalities T1<T3 and T2<T3 be satisfied. That is to say, the relationship among T1, T2 and T3 can be selected from among the following:

T1<T2<T3; T2<T1<T3; and *T*1<*T*2=*T*3.

Further, if the relationship T1<T3 is satisfied, T2 can be selected to be slightly longer than T3.

Although this Example 1 has been described as applied to a method of driving a liquid crystal display panel in a time-division multiplexed fashion in which the number of the time-division multiplexed signals (hereinafter called the time-division number) is three, the present invention can be extended to a case in which the time-division number is m, where m is an integer equal to or larger than 2.

Consider a case where m switches are provided which are comprised of first, second, . . . , mth switches and which are configured so as to supply m time-sequential signals outputted from a video line drive circuit successively to m video lines of a plurality of video lines in a time-division multiplexed fashion during a writing time T (a gate selection time) available for writing gray scale voltages into m sub-pixels, and assume that the mth switch is turned on last.

Let T1, T2, T3, . . . , T(m−1) and Tm be times during which the first, second, third, . . . , (m−1)th and mth switches are on, respectively. In this case it is only necessary that T1<Tm, T2<Tm, T3<Tm, . . . , T(m−1)<Tm. It is desirable that Tm>T/m, and it is preferable that Tm≧T/2.

However, as described above, the advantages of this Example 1 is obtained by selecting the ON-time Tm of a given switching element which supplies a gray scale voltage to a video line last during one gate selection time T to be longer than the ON-time Tn of at least one of switching elements which supply gray scale voltages to video lines before the given switching element during the one gate selection time T. Therefore the present invention is not limited to the above-mentioned condition, but it is only necessary that Tn<Tm.

The following explains the results obtained by studying the ON-time Tm of the switching element which supplies a gray scale voltage to a video line last during one gate selection time T. The length of time which can be allocated to the ON-time Tm varies with an increase in the time-division number. Table 1 below shows a desirable range obtained by simulation for a relationship between the time-division number m and the ratio of the ON-time Tm to the gate selection time T.

TABLE 1

| time-division number m | ON-time Tm |
|---|---|
| 3 | T/2 or more |
| 6 | T/3 or more |
| 9 | T/4 or more |
| 12 | T/5 or more |

The above results can be summarized by the following empirical formula.

$$Tm \geq T/(1+(m/3))$$

It is clear from the above-explained gist of this Example 1 that this formula is applicable to a case where the time-division number m is an integer other than a multiple of 3.

Further, shown below is a preferable range for the relationship between the time-division number m and the ratio of the ON-time Tm to the gate selection time T.

| time-division number m | ON-time Tm |
|---|---|
| 2 to 5 | $3T/4 \geq Tm \geq T/(1 + (m/3))$ |
| 6 or more | $2T/(1 + (m/3)) \geq Tm \geq T/(1 + (m/3))$ |

On the other hand, when this Example 1 is viewed from a different standpoint, it can be grasped as follows:

Consider a case where m switches are provided which are comprised of first, second, . . . , mth switches and which are configured so as to supply m time-sequential signals outputted from a video line drive circuit successively to m video lines of a plurality of video lines in a time-division multiplexed fashion during a writing time T (a gate selection time) available for writing gray scale voltages into m sub-pixels, and assume that the mth switch is turned on last.

Let Ts1, Ts2, Ts3, . . . , Ts(m−1) and Tsm be times from the beginning of the writing time T until the first, second, third, (m−1)th and mth switches are turned on, respectively. In this case it is only necessary that T−Tsm≧T/m, and it is preferable that T−Tsm≧T/2.

As described above, the advantages of this Example 1 is obtained by securing sufficiently the sub-pixel writing time (T−Tsm) during which a sub-pixel into which a gray scale voltage is written last during the gate selection time T, and therefore the ON-time Tm itself may be selected to be short.

Table 2 below shows a desirable range for a relationship between the time-division number m and the ratio of the time (T−Tsm) to the gate selection time T, which is obtained based upon Table 1.

TABLE 2

| time-division number m | time (T − Tsm) |
|---|---|
| 3 | T/2 or more |
| 6 | T/3 or more |
| 9 | T/4 or more |
| 12 | T/5 or more |

The above results can be summarized by the following empirical formula.

$$T-Tsm \geq T/(1+(m/3))$$

It is clear from the above-explained gist of this Example 1 that this formula is applicable to a case where the time-division number m is an integer other than a multiple of 3.

Further, shown below is a preferable range for the relationship between the time-division number m and the ratio of the time (T−Tsm) to the gate selection time T.

| time-division number m | ON-time Tm |
|---|---|
| 2 to 5 | $3T/4 \geq T - Tsm \geq T/(1 + (m/3))$ |
| 6 or more | $2T/(1 + (m/3)) \geq T - Tsm \geq T/(1 + (m/3))$ |

Example 2

In Example 1, times during which the video line selection pulses φR, φG and φB stay at the H level are not equal to each other in duration, but are made unequal to each other. To be concrete, T1=T2<T3.

Therefore, there is concern that the video-line writing times TdR and TdG for writing gray scale voltages into corresponding ones of the video lines D after the switching elements SW1 and SW2 being turned on might be insufficient in some cases. This Example 2 solves this problem.

Figure 3:
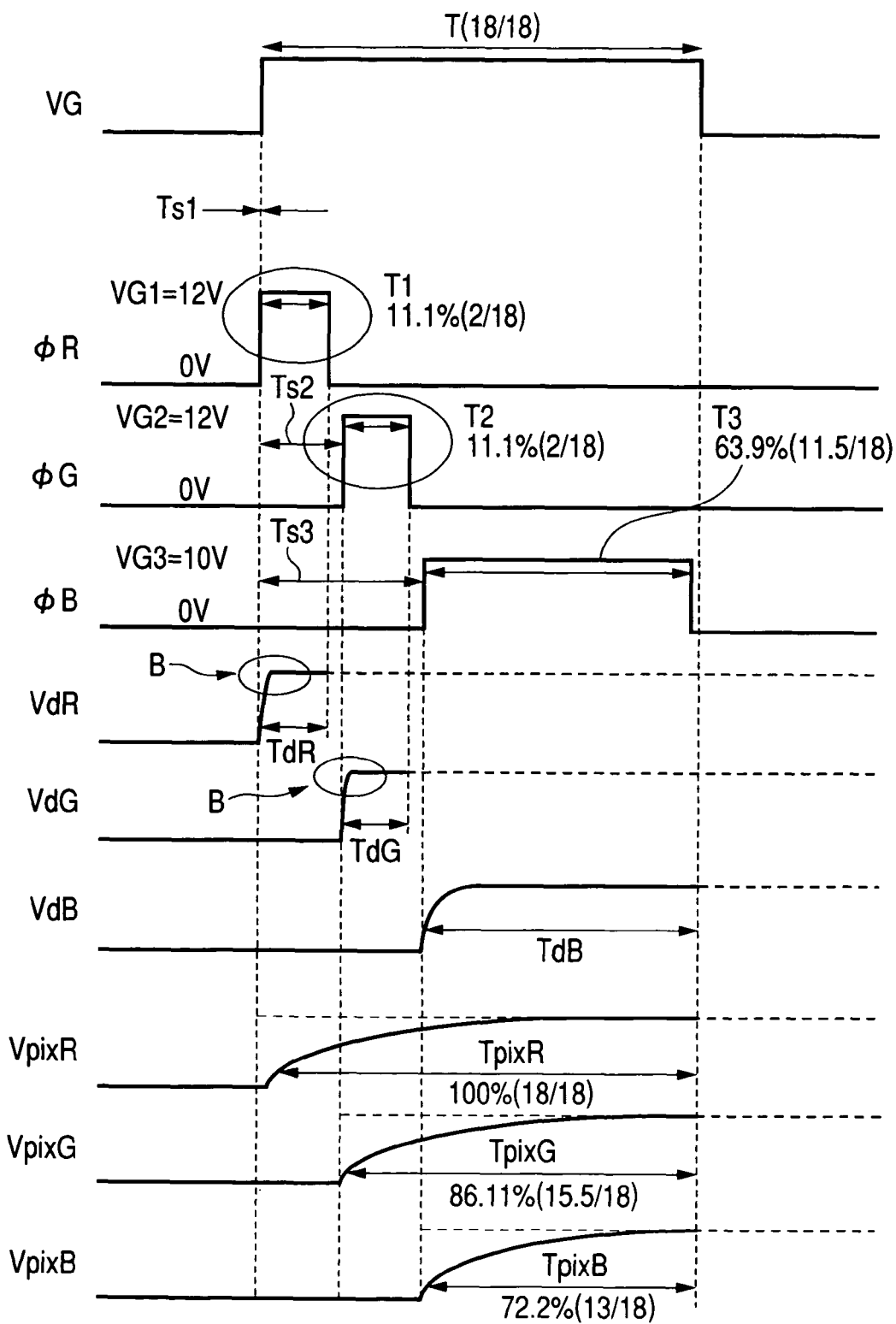
FIG. 3 is an illustration for explaining a time-division multiplexed driving method of Example 2 in accordance with the present invention.

FIG. 3 is an illustration for explaining a time-division multiplexed driving method of this Example 2. As shown in FIG. 3, in this Example 2, times during which the video line selection pulses φR, φG and φB stay at the H level are not equal to each other in duration, but are made unequal to each other. In addition to this, voltages VG1 and VG2 corresponding to the H levels of the video line selection pulses φR and φG, respectively, are selected to be higher than a voltage VG3 corresponding to the H level of the video line selection pulse φB so that the ON-resistances of thin film transistors forming the switching elements SW1 and SW2 are made lower. That is to say, the voltages VG1, VG2 and VG3 are selected to satisfy the relationship: VG1=VG2>VG3. In FIG. 3, VG1=VG2=12 V, and VG3=10 V.

The voltages VdR, VdG and VdB rise when the video line selection pulses φR, φG and φB go to the H levels, respectively. In this Example 2, since the ON-resistances of the thin film transistors forming the switching elements SW1 and SW2 are made lower than the ON-resistance of the thin film transistor forming the switching element SW3, the voltages VdR and VdG rise more sharply than the voltage VdB as shown in portions designated B in FIG. 3. This prevents the video-line writing times TdR and TdG from becoming insufficient.

Incidentally, since the switching elements SW1, SW2 and SW3 are formed of n-type thin film transistors in the above explanation, the voltages VG1 and VG2 corresponding to the H levels of the video line selection pulses φR and φG, respectively, are selected to be higher than the voltage VG3 corresponding to the H level of the video line selection pulse φB. However, in a case where the switching elements SW1, SW2 and SW3 are formed of p-type thin film transistors in the above explanation, the voltages VG1 and VG2 corresponding to the ON levels of the video line selection pulses φR and φG, respectively, are selected to be lower than the voltage VG3 corresponding to the ON level of the video line selection pulse φB, assuming the switching elements SW1, SW2 and SW3 are turned off at a voltage of zero.

In view of this, let VG1, VG2 and VG3 be voltage differences between control voltages applied on gate electrodes of the switching elements SW1, SW2 and SW3 for turning off the switching elements SW1, SW2 and SW3, respectively, and control voltages applied on the gate electrodes of the switching elements SW1, SW2 and SW3 for turning on the switching elements SW1, SW2 and SW3, respectively, and let |VG1|, |VG2| and |VG3| be the absolute values of VG1, VG2 and VG3, respectively. Then, in this Example 2, it is necessary that |VG1|=|VG2|>|VG3|.

Further, the relationship among T1, T2 and T3 is such that T1<T2<T3, the relationship among |VG1|, |VG2| and |VG3| may be selected such that |VG1|>|VG2|>|VG3|.

Further, when this Example 2 is extended to a case in which the time-division number is m, the relationship is such that |VG1|>|VGm|, |VG2|>|VGm|, ..., |VG(m−1)|>|VGm|.

However, as described above, the present invention is applicable to the configuration in which the ON-time Tm of a given switching element which supplies a gray scale voltage to a video line last during one gate selection time T is selected to be longer than the ON-time Tn of at least one of switching elements which supply gray scale voltages to video lines before the given switching element during the one gate selection time T. Therefore the present invention is not limited to the above-mentioned condition, but it is only necessary that |VGn|>|VGm|, where |VGn| is the absolute value of a voltage difference VGn between a control voltage applied on a gate electrode of the switching element associated with the above-mentioned ON-time Tn for turning off the switching element and a control voltage applied on the gate electrode of the switching element for turning on the switching element.

Example 3

As in the case of Example 2, this Example 3 also solves the problem of possible insufficiency of the video-line writing times TdR and TdG for writing gray scale voltages into corresponding ones of the video lines D after the switching elements SW1 and SW2 are turned on.

This Example 3 selects the ON-currents of the thin film transistors forming the switching elements SW1 and SW2 to be larger than the ON-current of the thin film transistor forming the switching element SW3. The voltages VdR, VdG and VdB rise when the video line selection pulses φR, φG and φB go to the H levels, respectively. In this Example 3, since the ON-currents of the thin film transistors forming the switching elements SW1 and SW2 are made larger than the ON-current of the thin film transistor forming the switching element SW3, the voltages VdR and VdG rise more sharply than the voltage VdB like in the portions designated B in FIG. 3. This prevents the video-line writing times TdR and TdG from becoming insufficient.

The following are methods of making the ON-currents of the thin film transistors forming the switching elements SW1 and SW2 larger than the ON-current of the thin film transistor forming the switching element SW3:

(1) The widths W1 and W2 of gates of the thin film transistors forming the switching elements SW1 and SW2, respectively, are selected to be larger than the width W3 of a gate of the thin film transistor forming the switching element SW3. That is to say, W1=W2>W3, or W1>W2>W3. Further, the relationship may also be selected to be W2>W1>W3.

(2) The lengths L1 and L2 of gates of the thin film transistors forming the switching elements SW1 and SW2, respectively, are selected to be shorter than the length L3 of a gate of the thin film transistor forming the switching element SW3. That is to say, L1=L2<L3, or L1<L2<L3. Further, the relationship may also be selected to be L2<L1<L3.

Further, when the above methods (1) and (2) are extended to cases in which the time-division number is m, the relationships are such that W1>Wm, W2>Wm, ..., W(m−1)>Wm, and L1<Lm, L2<Lm, L(m−1)<Lm, respectively.

However, as described above, the present invention is applicable to the configuration in which the ON-time Tm of a given switching element which supplies a gray scale voltage to a video line last during one gate selection time T is selected to be longer than the ON-time Tn of at least one of switching elements which supply gray scale voltages to video lines before the given switching element during the one gate selection time T. Therefore the present invention is not limited to the above-mentioned condition, but it is only necessary that at least one of the following inequalities is satisfied:

Wn>Wm and Ln<Lm, where Wn and Ln are a width and a length, respectively, of a gate of the switching element associated with the above-mentioned ON-time Tn.

Figure 4:
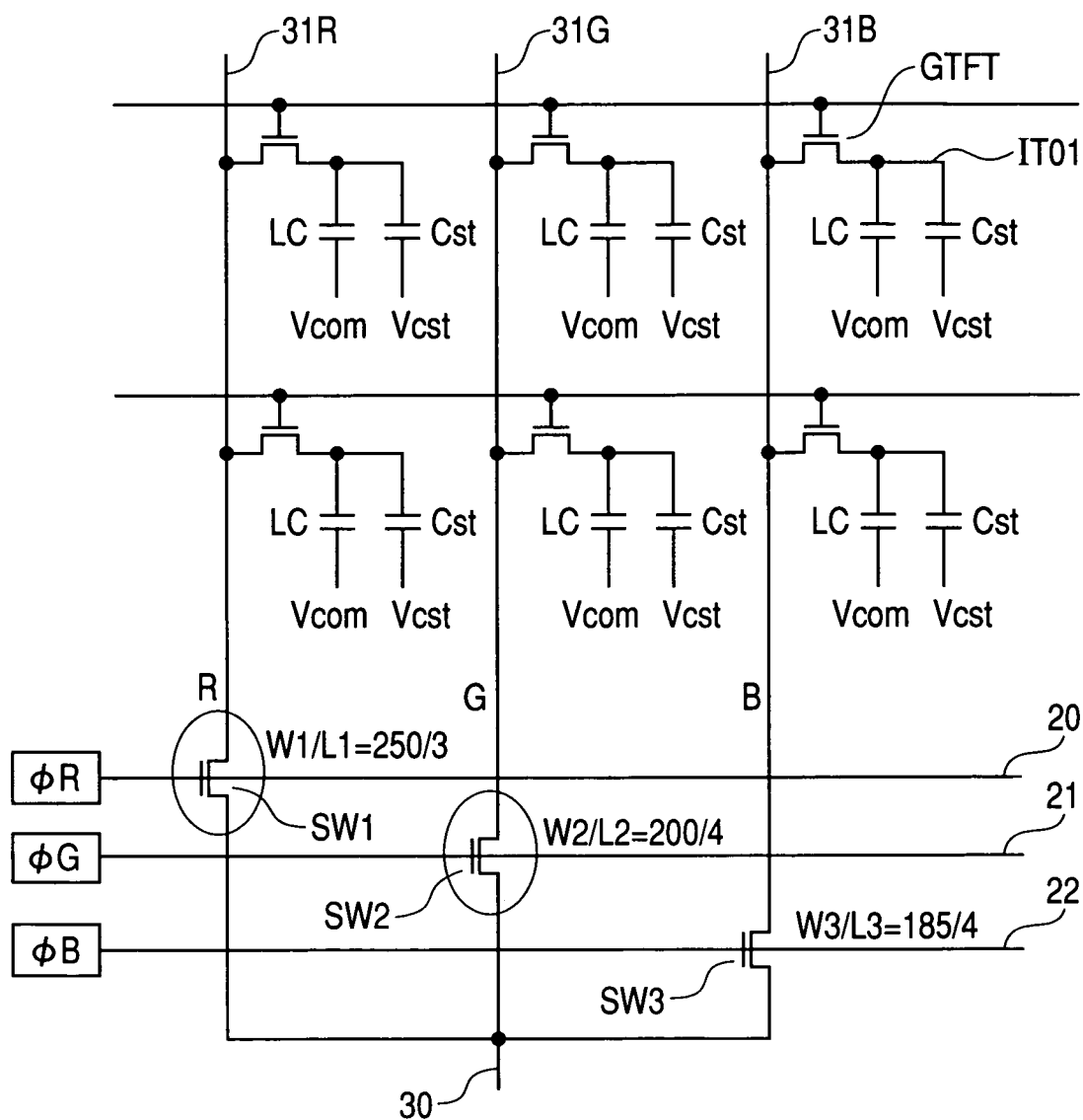
FIG. 4 is an illustration for explaining an example of the gate widths and gate lengths of thin film transistors forming switching elements in Example 3 in accordance with the present invention.

FIG. 4 is an illustration for explaining an example of the gate widths W1, W2 and W3 and gate lengths L1, L2 and L3 of thin film transistors forming the switching elements SW1, SW2 and SW3, respectively, in this Example 3.

In FIG. 4, the ratio W1/L1 of the gate width W1 to the gate length L1 of the thin film transistor forming the switching element SW1 is selected to be 250/3, the ratio W2/L2 of the gate width W2 to the gate length L2 of the thin film transistor forming the switching element SW2 is selected to be 200/4, and the ratio W3/L3 of the gate width W3 to the gate length L3 of the thin film transistor forming the switching element SW3 is selected to be 185/4.

Figure 5:
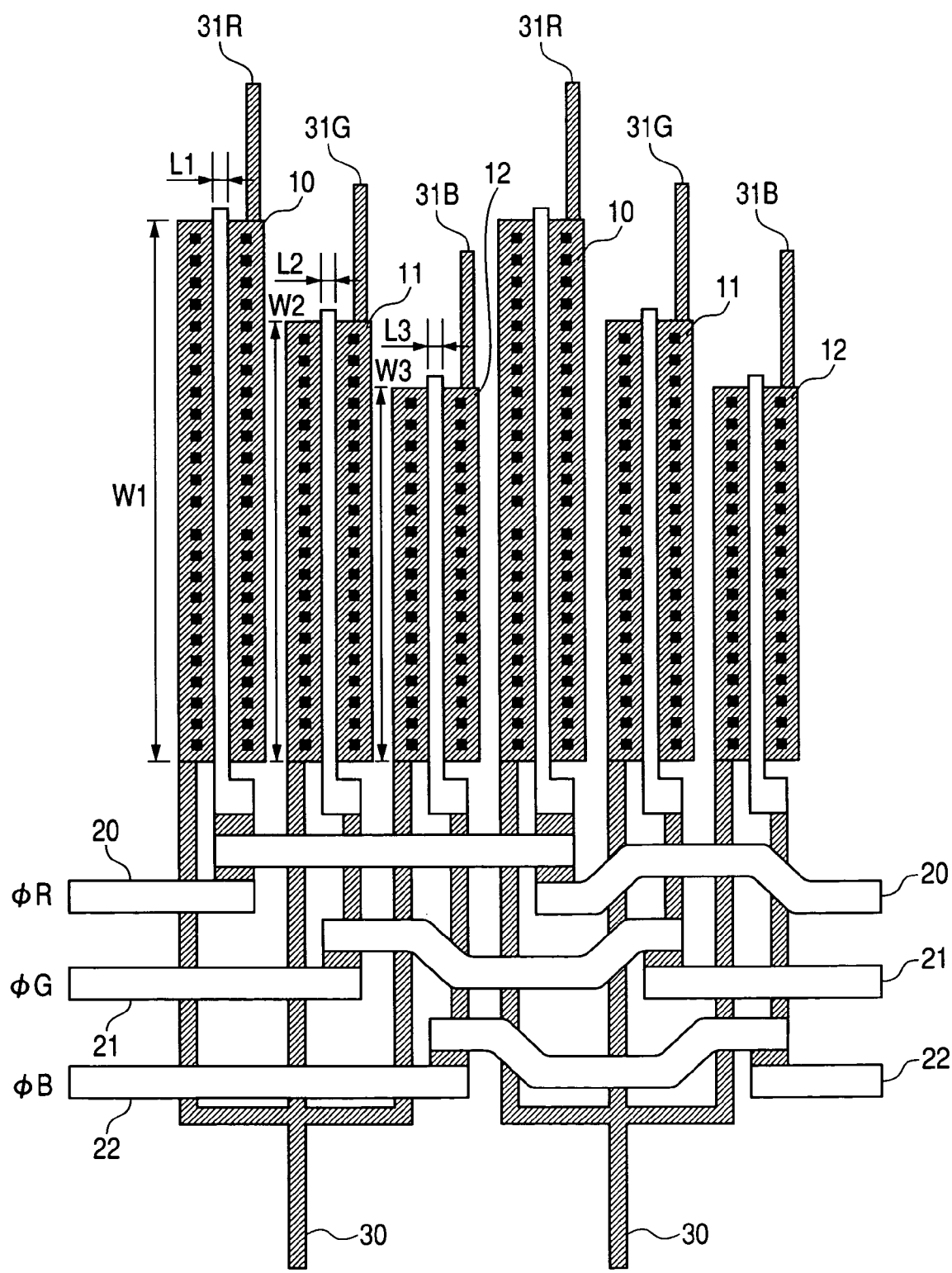
FIG. 5 is an illustration depicting an example of a geometrical circuit layout in which the gate widths W1, W2 and W3 of three thin film transistors forming switching elements are selected to be W1>W2>W3 in Example 3 in accordance with the present invention.

FIG. 5 depicts an example of a geometrical circuit layout in which the gate widths W1, W2 and W3 of the thin film transistors forming the switching elements SW1, SW2 and SW3, respectively, when the relationship among W1, W2 and W3 is selected to be W1>W2>W3.

In FIGS. 4 and 5, reference numeral 10 denotes the thin film transistors forming the switching elements SW1, reference numeral 11 denotes the thin film transistors forming the switching elements SW2, and reference numeral 12 denotes the thin film transistors forming the switching elements SW3. Reference numeral 20 denotes signal lines supplied with the video line selection pulse φR, reference numeral 21 denotes signal lines supplied with the video line selection pulse φG, and reference numeral 22 denotes signal lines supplied with the video line selection pulse φB. Reference numeral 30 denotes signal lines supplied with gray scale voltages from the drain driver 100, and reference numerals 31R, 31G and 31B denote video lines for red (R), green (G) and blue (B), respectively.

Example 4

As in the case of the previous Example 2, this Example 4 also solves the problem of possible insufficiency of the video-line writing times TdR and TdG for writing gray scale voltages into corresponding ones of the video lines D after the switching elements SW1 and SW2 are turned on.

In this Example 4, impedances (or load capacitances) Z1 and Z2 as viewed from the switching elements SW1 and SW2 into corresponding ones of the video lines D, respectively, are selected to be lower than an impedance Z3 as viewed from the switching element SW3 into a corresponding one of the video lines D.

Further, when this Example 4 is extended to a case in which the time-division number is m, the relationship is such that Z1<Zm, Z2<Zm, ..., Z(m−1)<Zm.

The voltages VdR, VdG and VdB rise when the video line selection pulses φR, φG and φB go to the H level, respectively. In this Example 4, since the impedances (or load capacitances) Z1 and Z2 as viewed from the switching elements SW1 and SW2 into corresponding ones of the video lines D, respectively, are selected to be lower than an impedance Z3 as viewed from the switching element SW3 into a corresponding one of the video lines D, the voltages VdR and VdG rise more sharply than the voltage VdB like in the portions designated B in FIG. 3. This prevents the video-line writing times TdR and TdG from becoming insufficient.

The following is a method of making the impedances Z1 and Z2 as viewed from the switching elements SW1 and SW2 into corresponding ones of the video lines D, respectively, lower than an impedance Z3 as viewed from the switching element SW3 into a corresponding one of the video lines D:

Resistances of the video lines coupled to the switching elements SW1 and SW2, respectively, are selected to be lower than a resistance of the video line D coupled to the switching element SW3.

Figure 6:
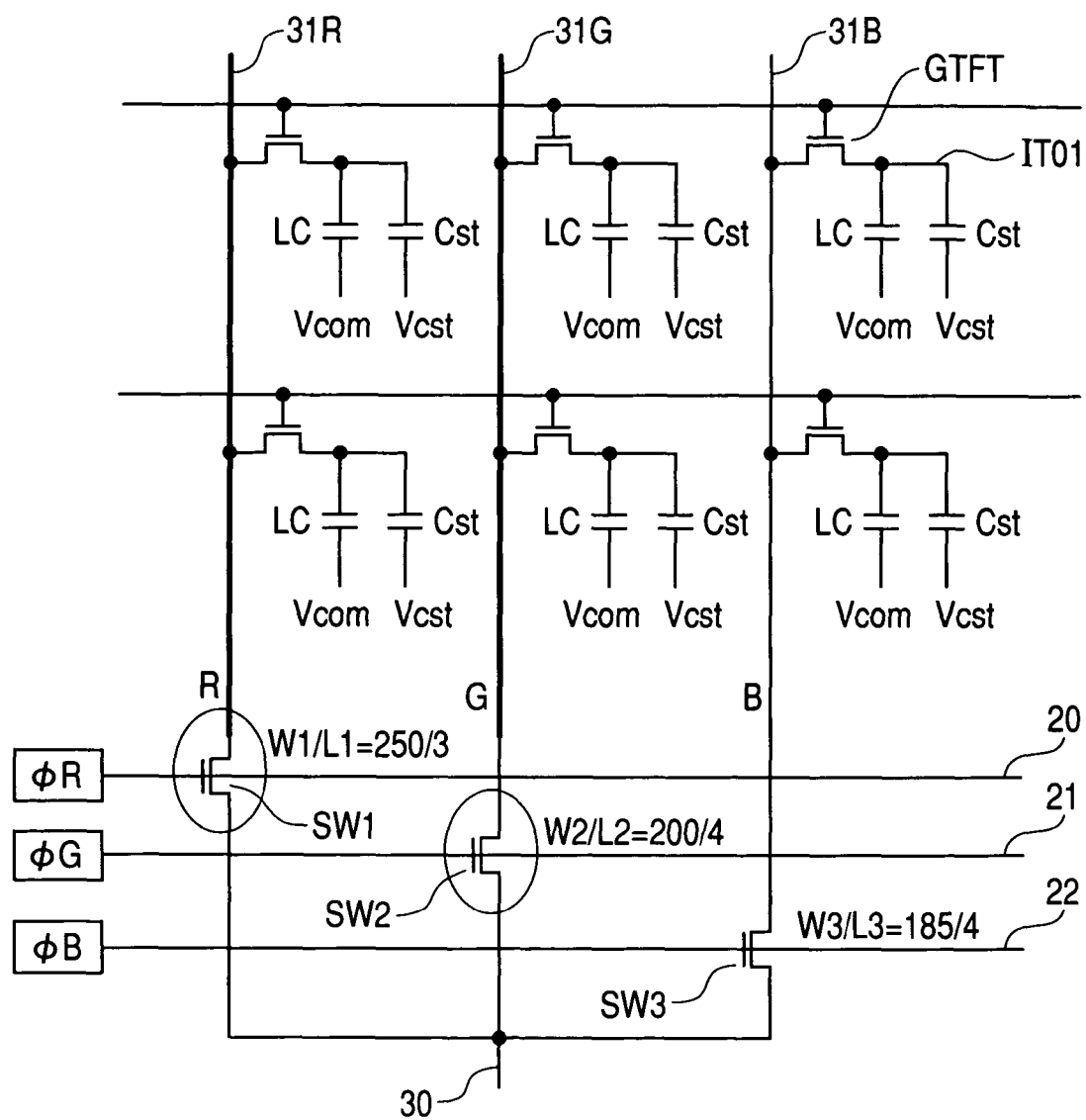
FIG. 6 is an illustration for explaining an example of video lines coupled to switching elements in Example 4 in accordance with the present invention.

FIG. 6 is an illustration for explaining an example of the video lines D coupled to the switching elements SW1, SW2 and SW3 of this Example 4. In FIG. 6, the cross-sectional areas of the video lines 31R and 31G coupled to the switching elements SW1 and SW2, respectively, are made larger than the cross-sectional area of the video line 31B coupled to the switching element SW3 so that the resistances of the video lines 31R and 31G coupled to the switching elements SW1 and SW2, respectively, are selected to be lower than a resistance of the video line 31B coupled to the switching element SW3.

However, as described above, the present invention is applicable to the configuration in which the ON-time Tm of a given switching element which supplies a gray scale voltage to a video line last during one gate selection time T is selected to be longer than the ON-time Tn of at least one of switching elements which supply gray scale voltages to video lines before the given switching element during the one gate selection time T. Therefore the present invention is not limited to the above-mentioned condition, but it is only necessary that Zn<Zm, where zn is an impedance as viewed from the switching element associated with the above-mentioned ON-time Tn into a corresponding one of the video lines, and Zm is an impedance as viewed from the switching element associated with the above-mentioned ON-time Tm into a corresponding one of the video lines.

Further, this Example 4 is also applicable to the previous Example 2 or 3, in this case insufficiency of the video-line writing times TdR and TdG can be effectively prevented.

Further, although in the above explanation, the examples in which the present invention is applied to the liquid crystal display modules, the present invention is not limited to the above examples, but the present invention is also applicable to an EL (Electroluminescent) display device employing an EL element.

While the present invention has been described concretely using the examples, the present is not limited to the examples, and various changes and modifications can be made to these examples without departing from the true sprit and scope of the present invention.

What is claimed is:

1. A display device comprising:
a display section including a plurality of sub-pixels and a plurality of video lines which supply gray scale voltages to said plurality of sub-pixels,
said plurality of video lines being divided into a plurality of blocks each comprised of m video lines of said plurality of video lines, m being an integer equal to or greater than 2;
a video line drive circuit which outputs m gray scale voltages corresponding to m video lines of each of said plurality of blocks time-sequentially; and
a plurality of switch groups each comprised of first to mth switches,
each of said plurality of switch groups corresponding to one of said plurality of blocks of video lines, receiving said m gray scale voltages from said video line drive circuit, and then supplying said m gray scale voltages to said m video lines of said one of said plurality of blocks in a time-division multiplexed fashion,
wherein:
said mth switch is turned on last during a writing time T during which said m gray scale voltages are written into corresponding ones of said plurality of sub-pixels, and the following inequality is satisfied:

$$Tq<Tm,$$

where Tm is a time during which said mth switch is turned on, Tq is a time during which a qth switch of said first to (m−1)th switches is turned on, and q is an integer of from 1 to (m−1), and
said first to mth switches are first to mth switching elements comprised of transistors, respectively, and the following inequality is satisfied:

$$|VGr|>|VGm|,$$

where |VGr| is an absolute value of a voltage difference between a control voltage applied on an rth switching element of said first to (m−1)th switching elements for turning off said rth switching element and a control voltage applied on said rth switching element for turning on said rth switching element, r being an integer of from 1 to (m−1), and |VGm| is an absolute value of a voltage difference between a control voltage applied on said mth switching element for turning off said mth switching element and a control voltage applied on said mth switching element for turning on said mth switching element.

2. A display device comprising:
a display section including a plurality of sub-pixels and a plurality of video lines which supply gray scale voltages to said plurality of sub-pixels,
said plurality of video lines being divided into a plurality of blocks each comprised of m video lines of said plurality of video lines, m being an integer equal to or greater than 2;
a video line drive circuit which outputs m gray scale voltages corresponding to m video lines of each of said plurality of blocks time-sequentially; and
a plurality of switch groups each comprised of first to mth switches,
each of said plurality of switch groups corresponding to one of said plurality of blocks of video lines, receiving said m gray scale voltages from said video line drive circuit, and then supplying said m gray scale voltages to said m video lines of said one of said plurality of blocks in a time-division multiplexed fashion, wherein:
said mth switch is turned on last during a writing time T during which said m gray scale voltages are written into corresponding ones of said plurality of sub-pixels, and the following inequality is satisfied:

$T-Tsq > T/m,$ where Tsq is a time from a beginning of said writing time T until a qth switch of said first to mth switches is turned on, and q is an integer of from 1 to m, and
said first to mth switches are first to mth switching elements comprised of transistors, respectively, and the following inequality is satisfied:

$|VGr| > |VGm|,$ where |VGr| is an absolute value of a voltage difference between a control voltage applied on an rth switching element of said first to (m−1)th switching elements for turning off said rth switching element and a control voltage applied on said rth switching element for turning on said rth switching element, r being an integer of from 1 to (m−1), and |VGm| is an absolute value of a voltage difference between a control voltage applied on said mth switching element for turning off said mth switching element and a control voltage applied on said mth switching element for turning on said mth switching element.

3. A display device comprising:
a display section including a plurality of sub-pixels and a plurality of video lines which supply gray scale voltages to said plurality of sub-pixels,
said plurality of video lines being divided into a plurality of blocks each comprised of m video lines of said plurality of video lines, m being an integer equal to or greater than 2;
a video line drive circuit which outputs m gray scale voltages corresponding to m video lines of each of said plurality of blocks time-sequentially; and
a plurality of switch groups each comprised of first to mth switches,
each of said plurality of switch groups corresponding to one of said plurality of blocks of video lines, receiving said m gray scale voltages from said video line drive circuit, and then supplying said m gray scale voltages to said m video lines of said one of said plurality of blocks in a time-division multiplexed fashion,
wherein:
said mth switch is turned on last during a writing time T during which said m gray scale voltages are written into corresponding ones of said plurality of sub-pixels, and there is a qth switch among said first to (m−1)th switches, said qth switch satisfying the following inequality:

$Tq < Tm,$ where Tm is a time during which said mth switch is turned on, and Tq is a time during which said qth switch is turned on, and
said first to mth switches are first to mth switching elements comprised of transistors, respectively, and there is an rth switch among said first to (m−1)th switches, said rth switch satisfying the following inequality:

$|VGr| > |VGm|,$ where |VGr| is an absolute value of a voltage difference between a control voltage applied on said rth switching element for turning off said rth switching element and a control voltage applied on said rth switching element for turning on said rth switching element, and |VGm| is an absolute value of a voltage difference between a control voltage applied on said mth switching element for turning off said mth switching element and a control voltage applied on said mth switching element for turning on said mth switching element.

* * * * *